(No Model.)

L. L. MAST.
WEATHER STRIP.

No. 347,493. Patented Aug. 17, 1886.

WITNESSES:
Leopold Leibold
Louis S. Reibold

INVENTOR
L. Lavake Mast
BY B. Pickering
His ATTORNEY

UNITED STATES PATENT OFFICE.

L. LAVAKE MAST, OF WEST MILTON, OHIO.

WEATHER-STRIP.

SPECIFICATION forming part of Letters Patent No. 347,493, dated August 17, 1886.

Application filed January 8, 1886. Serial No. 187,951. (No model.)

*To all whom it may concern:*

Be it known that I, L. LAVAKE MAST, a citizen of the United States, residing at West Milton, in the county of Miami and State of Ohio, have invented certain new and useful Improvements in Weather-Strips; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

My invention relates to improvements in weather-strips and the manner of suspending them on doors and the mode of operating the same. The peculiar construction will be hereinafter fully set forth.

The objects of my invention are to exclude the water during storms from passing beneath the door, and to close the edge of the weather-strip against the door-step, that the door shall not be sprung by the action necessary to close down the said strip, which is held up by a spring to prevent the same from dragging over the floor or carpet. I attain these objects by the mechanism illustrated in the accompanying drawings, in which—

Figure 1:
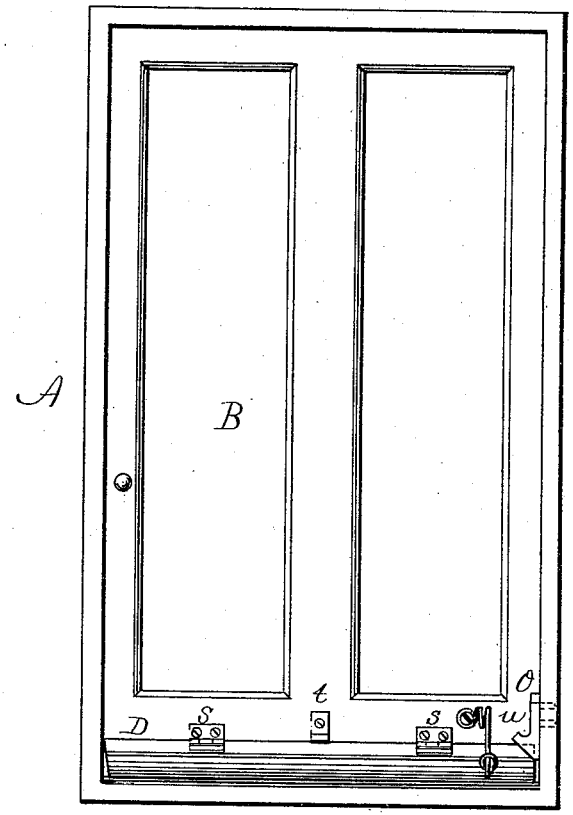
Figure 2:
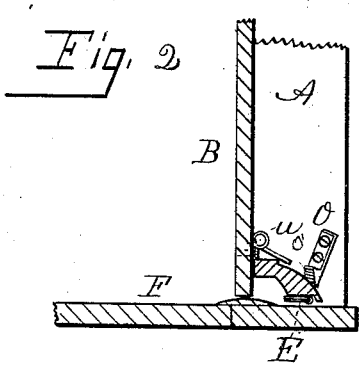
Figure 3:
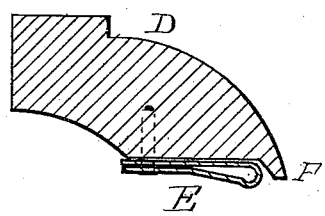

Figure 1 is a front view of a door with the weather-strip attached thereunto. Fig. 2 is a fragmentary cross-section of the same. Fig. 3 is a cross-section of the weather-strip.

Similar letters designate like parts throughout the several views.

In the drawings, A is the frame to which the door B is hinged. D is a strip of wood, of the form shown in cross-section at Fig. 3.

The peculiarity, as compared with weather-strips in use, is, that it has a lip or rim, F, beneath the base-line, to which the folded piece of rubber cloth E is attached. This extends downwardly so as to nearly cover the said cloth. The object of this extension is to prevent the rubber cloth from freezing to the step, to which it is less liable when thus covered. The folding of the rubber cloth gives and tends to preserve that elasticity necessary to fully close the space beneath the weather-strip.

The weather strip is fastened to the door by the hinges S S.

The wire spring $u$ is fastened to the door by a screw, and the end of which spring enters the eye of an eye-screw, and by this device the weather-strip is held above the floor when the door is swung around. To prevent the said strip from being too much elevated, the check $t$ is used for the purpose.

On the side of the door-frame to which the hinges are attached is secured the stud O. This stud has an oblique face, O', which in closing the door depresses the weather-strip, and thereby excludes the water during rains.

The general features of this construction do not differ from door weather-strips in use, the novel features being the stud for depressing the weather-strip and the projecting rim at base to protect the rubber cloth. When the stud is placed as usual to depress the weather-strip, the swinging end of the door coming in contact therewith tends to spring the door, and the same becomes permanentl warped.

I am aware that hinged strips with flexible facing, which are forced down by inclined lugs on the door-jamb, have been in use prior to my invention.

Having fully described my invention, what I claim, and desire to secure by Letters Patent, is—

The combination, with a door, of the hinged strip D, having the under cut-away portion, in which is the double flexible strip protected by the lip or nose along the edge of the strip, the depressing-stud O, having the inclined surface, and the elevating-spring $u$, all substantially as shown and described.

In testimony that I claim the foregoing as my own I affix my signature in presence of two witnesses.

L. LAVAKE MAST.

Witnesses:
B. PICKERING,
SUMNER T. SMITH.